United States Patent [19]

Dashevsky

[11] Patent Number: 5,678,964

[45] Date of Patent: Oct. 21, 1997

[54] METHOD OF DETERMINING SLIDE STRAIGHTNESS AND FOR PROVIDING A STRAIGHT REFERENCE SURFACE FOR A MACHINE TOOL

[76] Inventor: Leon G. Dashevsky, 3518 Pilgrim La. North, Plymouth, Minn. 55441

[21] Appl. No.: 513,454

[22] Filed: Aug. 10, 1995

[51] Int. Cl.$^6$ ........................................ B23C 3/00
[52] U.S. Cl. .................. 409/132; 409/244; 409/293; 451/9; 451/10
[58] Field of Search ............... 451/10, 9, 150, 451/142; 318/649; 409/132, 131, 133, 195, 244, 293

[56] References Cited

U.S. PATENT DOCUMENTS

| | | | |
|---|---|---|---|
| 2,924,768 | 2/1960 | Farrand et al. | 318/480 |
| 2,937,325 | 5/1960 | Garber | 318/28 |
| 3,039,032 | 6/1962 | Fowler | 318/30 |
| 3,348,435 | 10/1967 | Lauper | 77/63 |
| 3,513,603 | 5/1970 | Farmer | 51/323 |
| 3,668,501 | 6/1972 | Chitayat | 318/632 |
| 4,270,421 | 6/1981 | Robinson et al. | 82/21 A |
| 5,129,436 | 7/1992 | Curtis et al. | 144/142 |
| 5,146,962 | 9/1992 | Drees | 144/137 |
| 5,245,264 | 9/1993 | Helgren et al. | 318/568.22 |

OTHER PUBLICATIONS

"How Straight is 'straight?'" *American Machinist*, Dec. 1989 pp. 61–65.

*Primary Examiner*—M. Rachuba
*Assistant Examiner*—Christopher Kirkman
*Attorney, Agent, or Firm*—Westman, Champlin & Kelly, P.A.

[57] ABSTRACT

A machine tool having a machining member such as a grinding wheel, a milling cutter, a shaping cutter or also includes a slide on which a straight edge bar is mounted. The straight edge bar is engaged by the machining member to machine a surface on the bar held on the slide. The slide is moved at the feed rate used for machining with the particular machining member used, and then the bar is rotated about its longitudinal axis, that is, the axis parallel to the movement of the slide. The amount of error from a straight line that has been formed is sensed by sensors positioned in the same plane as the contact line of the grinding wheel. The actual error of the slide is thus determined, and portions of the surface of the bar can be gradually scraped or refined by other means until the sensors indicate that the surface has become a precise straight edge. The straight edge surface can then be used as a reference for checking workpieces or for automatic error compensation. Surfaces at 90° to the first formed surface also can be corrected by rotating the workpiece to the desired position, running the machine slide and machine tool at the desired feed rate, and then determining the error from a straight line after rotating the workpiece about its longitudinal axis.

15 Claims, 10 Drawing Sheets

METHOD OF DETERMINING SLIDE STRAIGHTNESS AND FOR PROVIDING A STRAIGHT REFERENCE SURFACE FOR A MACHINE TOOL

BACKGROUND OF THE INVENTION

The present invention relates to a method for determining a slide error of a machine tool slide and creating a straight surface on a straight edge bar directly on the machine to be used and utilizing the error data or straight surface for checking workpieces as they are machined, or for other purposes, such as closed loop control of a straight slide motion.

It has been recognized that the "straightness" of a surface that is generated is dependent upon the straightness of the machine tool slide, when working in the open loop system.

Figure 1:
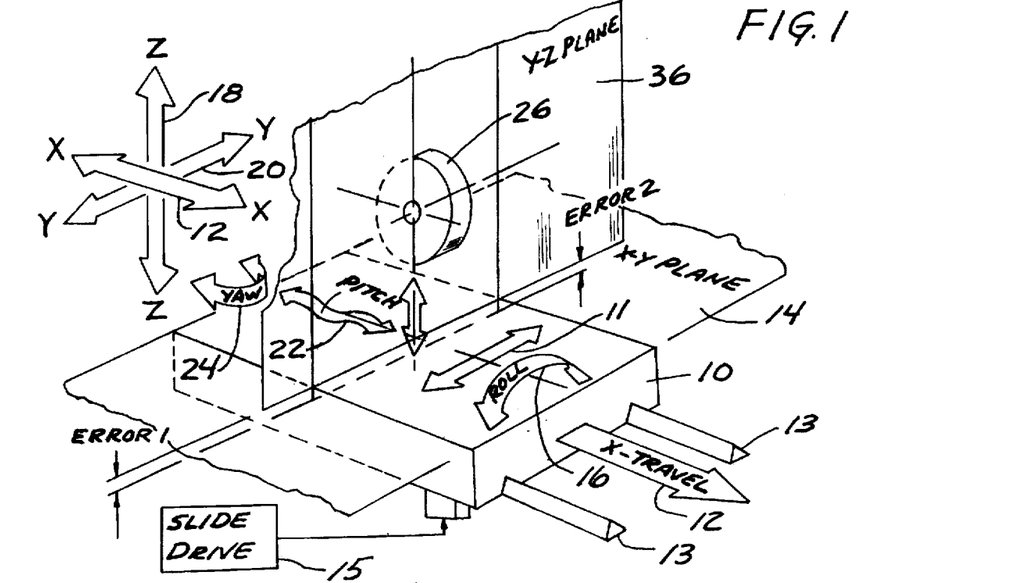
FIG. 1 is a schematic representational view to illustrate inaccuracies in a longitudinal X-axis slide.

It has been recognized that in any machine system there are five degrees of freedom that provide for possible errors in a longitudinal X-axis slide. FIG. 1 of the accompanying drawings represents these errors. They include translation in the Y-axis, that is deviations from a straight line in the Y-axis (or horizontal axis), translation in the Z or vertical axis, and rotation about the X-axis, which is the axis of movement of the slide. This rotational error is normally termed "roll" error. Further, errors can arise from rotation about the Y-axis, which is the axis perpendicular to the direction of travel. Rotation about the Y-axis is normally called pitch. Errors from rotation about the Z-axis are normally called "yaw" errors.

The arrangement shown in FIG. 1 assumes that the surface that is to be machined flat and straight is the top X-Y surface of the workpiece, as illustrated and labeled. The ideal flat X-Y plane is the upper surface of this workpiece.

The translation in the Y-axis, that is movement along the Y-axis and rotation about the Z-axis or "yaw" will not contribute any error to the flatness of the machined workpiece in the X-Y plane, because such movement does not bring any vertical displacement of the workpiece relative to the cutting tool. FIG. 1 will be more fully described in the Description of the Preferred Embodiments. However, X-axis roll, pitch and "yaw" problems as well as translation in the Y and Z axes have been recognized in the prior art.

Various attempts to solve the errors that arise have been made. U.S. Pat. No. 2,924,768 illustrates the use of an optical axis of a light or laser beam as a reference straight line, but this has certain limitations including high cost and the need for having very flat reflecting mirrors, and precise mounting of the components and the measuring system on the machine. Some deflection of the components of the machine can also occur, and if these components are holding the measuring systems the component deflection will create unwanted movements resulting in measuring errors. In addition, the ambient temperature becomes very critical in this type of an application in order to provide repeatability, and it is nearly impossible to meet the temperature control requirement in an economical fashion. The method described in U.S. Pat. No. 2,924,768 detects only horizontal errors of the slide motion. It does not detect roll of the slide, so a second light or laser beam system would be needed to accommodate that.

U.S. Pat. Nos. 2,937,325; 3,039,032; and 3,348,435 described methods of compensation for errors after the errors detected, measured and replicated on the reference rail which is also called a cam. No method for obtaining the precision replication of the actual error of the slide on the reference surface is disclosed, although these patents teach various ways of compensating for errors once the correct replication apparently has been made. U.S. Pat. No. '435 utilizes templates for a compensation function in each of the axes. U.S. Pat. Nos. 3,039,032 and 2,937,325 have error compensated actuation mechanisms or drives, utilizing cams for providing compensation signals.

U.S. Pat. No. 3,668,501 is of interest, in that it deals with replicating on a cam, the longitudinal position error resulting from error of the feeding mechanism. This is the error of the screw or the rack and pinion mechanism that drives the slide. The error of longitudinal displacement is measured as a difference between the actual longitudinal position of the slide measured with a laser interferometer, and the expected position calculated from known nominal displacement such as from movement of a drive screw having a known lead, or from rotation of the pinion if a gear drive is used. This method can be adapted for transverse error evaluation, as described in U.S. Pat. No. 2,924,768, but it is much more complex than the present method.

U.S. Pat. No. 4,270,421 uses a slide straightness and flatness error correction system, that includes a cam. The contours of the cam are made to compensate for the lack of straightness of the ways of the slide. This is done by running the machine through a cycle and measuring the discrepancies in the workpiece to form the cam. This deals with a method of compensation after the errors are detected and replicated on the cam, by running the machine through a cycle and measuring the discrepancies in the workpiece as caused by errors in the machine. This procedure is quite complex, time consuming and not feasible for large machines where long reference rails are needed.

U.S. Pat. No. 5,245,264 shows that problems with straightness still exists. A wire is used in this patent as a guide for maintaining a table or platform moving in a straight line. A taut wire can be used as a reference of straightness only in a horizontal plane. It is not straight in a vertical plane, in that wires sag. In addition, vibration of the wire will limit the precision that can be achieved using a wire.

Other patents that are of interest include U.S. Pat. Nos. 3,513,603; 5,129,436; and 5,146,962.

The methods of measuring described above all are performed on the slide to be evaluated as incrementally shifted from one static position to another or as the slide continuously moves at a very low speed to allow the charting of data. In a real machining situation, especially in reciprocating grinding, the slide is moving at a much greater speed; then much greater dynamic forces are applied from the feeding mechanism, resulting in substantially greater inertia forces, which in turn cause distortion in errors of the slide movement. This means that the errors, measured during the slide fabrication and evaluation are quite different from the actual errors emerging from the actual machining process.

This is especially true for large machines with large and heavy slides and with massive workpieces installed on the slides. In such applications, the forces required to move the slide at significant speed and to change the direction of its motion will affect the actual errors of the slide motion under different dynamic conditions. The actual errors of the slide motion thus may be quite different from the errors charted during the measurement proceedings.

The shortcomings of existing methods of slide straightness evaluation create significant problems for the most critical applications, that is where the machines must perform with the maximum possible precision. In such cases, the straightness measurements must be performed at the

3 highest possible precision on all stages of the machine existence, including its fabrication, during its intended use and maintenance, and during repair of the machine. A more reliable, precise, convenient and economical method of slide error evaluation in both horizontal and vertical planes aids in improving the precision of the machine during its fabrication while producing precision parts on the machine itself and for refurbishing the slide back to precision conditions during repair.

SUMMARY OF THE INVENTION

The present invention relates to a method for obtaining a machine tool slide error on a bar or rail and then creating a straight, flat surface on the bar using a machine tool such as a grinder, by evaluation of the machine tool slide error as reflected in a bar clamped and machined on the machine tool slide. The method includes compensating for irregularities in the slide to obtain a more precision workpiece.

The proposed method uses the principle of direct transfer of a consistent error of the slide onto the bar by machining and then uses a simple method of detecting this error by rotating the bar 180 degrees about its longitudinal axis and measuring double the error of the slide replicated on the bar.

A pair of vertically spaced rail edges on one side of a bar are used to obtain the slide error by clamping the bar onto the machine tool slide and grinding the edges while moving in direction along the longitudinal axis of the bar and while removing a minimal amount of material, and while utilizing the speed and feed rates of the machine tool as used for actual machining of the workpieces. After this grinding, the deviation of the ground or machined edge surfaces of the bar from a straight line or planar surface replicates the horizontal error of the machine tool slide in the X-Y plane, assuming that the machine tool slide moves along the slide X-axis.

To measure the actual deviation of the slide movement from a straight line, the bar is rotated 180° about its longitudinal axis, which is parallel to the X-axis of the machine tool slide, then the bar is aligned parallel to the X-axis of the slide on both ends and clamped back onto the machine tool slide. Two sensors are placed in the same Y-Z vertical plane as the centerline of the grinding wheel of the machine tool. The sensors contact the respective edge surfaces that were just ground on the same vertical line on which the grinding wheel was contacting the edge surfaces. The data from each sensor tracing on the ground surfaces of the bar as the slide is moved along its X-axis will show double the error of the machine tool slide resulting at actual working feed rates.

Once the data of the error is obtained, it can be manipulated in many different ways, either for correcting the straightness by mechanical means or by various known closed loop controls for error compensation. In the latter case this data can be directly manipulated as a reference error data without physical creation of the long straight reference bar. Nevertheless, in many cases the method of the present invention, based on the obtained data of error in the X-Y plane, allows creation of the straight reference surfaces on the machine, which is especially beneficial for evaluation of the slide error in a vertical X-Z plane.

To create a straight surface, the two ground surfaces on the bar are preferably formed as edge surfaces of narrow, vertically spaced rails. The rail surface that is engaged by a first sensor will be scraped or refined by other means, such as fine grinding, honing or polishing until the first sensor shows exactly one half of the reading of the second sensor, which remains on the second rail surface which is left as

4 originally ground. Once the indication desired is obtained, the surface engaged by the first sensor and fine ground, honed or polished is a precise straight edge, with all of the errors removed.

The bar discussed can also be machined on its second top surface for obtaining a straight surface along a vertical, X-Z plane.

To do this, the workpiece top surface is machined with conventional machining operations as previously described, and at the same time the top surface of the bar on which the straight edge in the X-Y plane has been formed, is also machined. The machined surface of the workpiece then is to be oriented vertically by rotating the workpiece 90° about its longitudinal axis. The workpiece surface is aligned parallel to the straight edge previously formed in the X-Y plane. The second sensor which sensed the rail surface that remained uncorrected is placed against the newly ground workpiece top surface, which now lies in a vertical plane, while the first sensor remains in contact with the straight edge in the X-Y plane. The difference between the readings of the first and second sensor represents the deviation of the top ground surface of the workpiece from the straight line in the X-Z plane. A third sensor is then placed to sense the top surface of the bar. The bar top surface is fine ground, honed or refined by other means until the third sensor engaging the top surface of the bar shows the same value as the difference between the readings of the first and second sensors. The result is that the top surface of the bar is formed into a straight, planar surface.

The present invention is used to obtain a slide error and then to form a reference bar having straight edge surfaces in two perpendicular planes. The bar then is used as a reference for checking the straightness of machined surfaces of a workpiece on a machine tool slide or for correction of the error of the slide during machining to obtain straight machined surfaces. The straight edge on the bar is formed directly on the machine tool with which the straight edge is to be used. By doing this, extremely long workpieces can be checked for straightness in comparison with long straight reference surfaces formed on the bar. In many instances, straight and flat machined surfaces that are in the range of 10 feet or longer are needed with a high degree of precision. Without the reliable straight reference on the machine tool for slide error measurement and correction, the results of making the workpieces are not satisfactory.

The process is relatively simple, and uses the actual machining operation performed at a feed rate that is used for actual machining of the real parts.

DETAILED DESCRIPTION OF THE PREFERRED EMBODIMENTS

In the drawings, FIG. 1 illustrates five possible types of inaccuracies of the slide that can occur in machine tool operation, which represents the degrees of freedom of the machine tool slide as the slide 10 moves along the X-axis of travel. These inaccuracies that can arise are translation of the machine tool slide 10 in a direction transverse to the X-axis direction of travel 12. This translation transverse to the X-axis is in the Y-axis and is illustrated by the double arrow 11. The X and Y axes form an X-Y plane indicated at 14. The machine tool slide 10 also can "roll" about the X-axis. This roll error is indicated by the arrow 16.

The machine tool slide 10 also can move or translate in direction along the Z-axis. The Z-axis is the vertical axis, indicated at the coordinates adjacent to the drawing at arrow 18. The Y-axis is indicated in the coordinates by arrow 20.

Further, there can be a pitch error, which is rotation about the Y-axis. This pitch error is indicated by the arrow 22. Rotation about the Z-axis also can occur, and this is indicated by yaw, and arrow 24.

The grinding wheel 26 is driven by a spindle about an axis parallel to the Y-axis in a desired, well-known manner. The spindle drive is not shown. Likewise, the machine tool slide 10 rests upon ways 13, and is driven along these ways with a suitable motor or drive indicated schematically at 15. The translation in the Z-axis, rotation about the Y-axis, or pitch, and rotation about X-axis or roll, will create a deviation from straight line movement resulting in an error in the X-Y plane 14.

Figure 2:
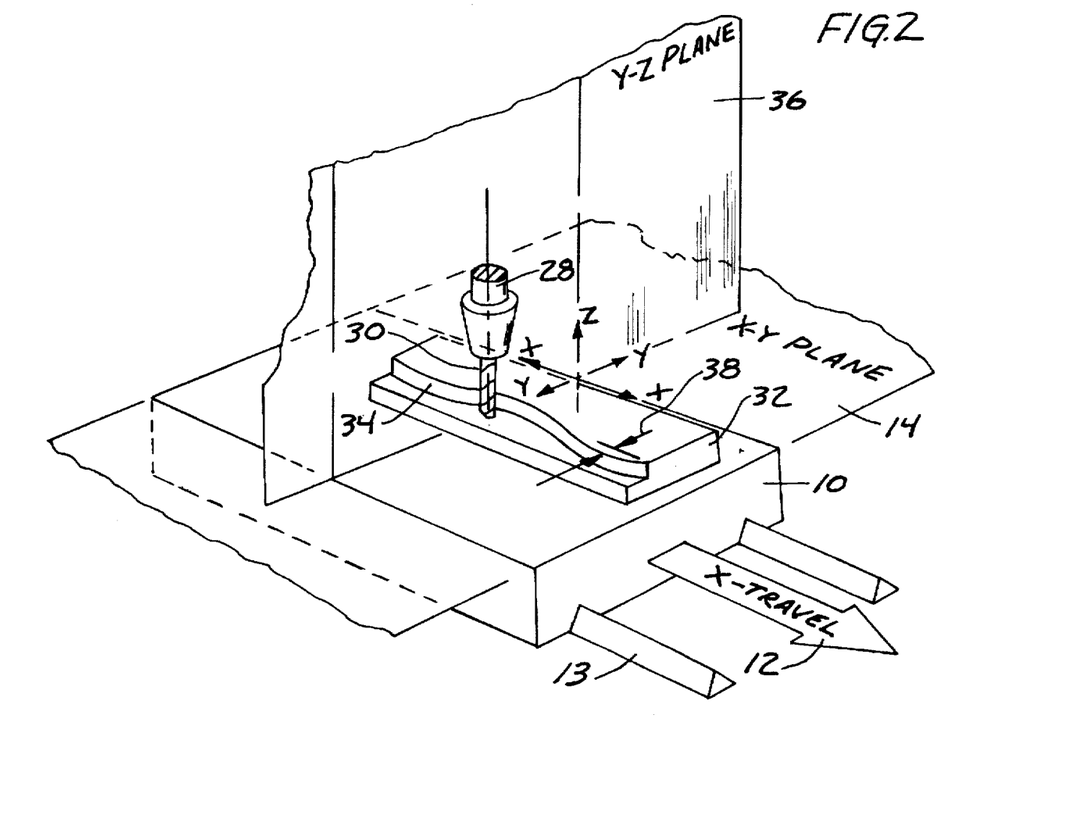
FIG. 2 is a perspective view of a workpiece in a machine tool illustrating the error created in the X-Y plane by a typical machine tool slide as it moves in the X-direction.

The translation in the Y-axis and the rotation about the Z-axis, or yaw, will not contribute to any error in flatness of the workpiece being machined in the X-Y plane, because they will not cause any vertical displacement of the workpiece relative to a tool, which as shown is a grinding wheel indicated at 26. At the same time, these two inaccuracies will affect the results of the machining when straight steps or shoulders are being machined on a workpiece, as shown in FIG. 2. In FIG. 2, a machine tool spindle 28 is used to rotate a tool 30 about an axis parallel to the Z-axis of a workpiece 32. The workpiece 32 is being machined to form a step or shoulder surface 34, and movement along the Y-axis, and thus in the Y-Z plane 36, which is perpendicular to the X-Y plane, will cause the surface 34 to have a curve and to develop an error indicated by the double arrows 38. This again is assuming that the machine tool slide 10 is moving in the X-axis direction of travel shown at 12.

To evaluate the accuracy of the machine tool slide 10 and its effect on the flatness of the machined plane of the workpiece 32 in the X-Y plane, all three sources of unwanted vertical displacement mentioned above and shown in FIG. 1 will have to be considered. These are translation in the Z-axis, rotation about the X-axis, or roll, and rotation about the Y-axis, or pitch. Each one of these displacements will affect the final deviation of the machined surface from a desired flat X-Y plane.

The flatness of the machined surface can be checked at the present time with known methods, such as a straight edge that has been previously formed, or by a light beam used in an autocollimator or in a laser interferometer. The question remains as to how straight a line these methods can provide, and how feasible the application of these methods actually is in practice. The use of a straight edge for measurements has a number of limitations because long straight edges are bulky, and the cross section of the straight edge body must be strong enough to minimize any deflection of the straight edge and to maintain the straightness of the edge. Use of a heavy, straight edge member becomes inconvenient. The straightness of the edge must be perfect or the deviation from actual flatness or straightness at each particular point of the edge must be measured prior to its use. If used in a vertical position, the straight edge has a significant deflection which must be considered in the measurement results and this complicates the process of measurement. Long straight edges are prone to distortion due to temperature variations, and are very expensive to make through the existing methods of manufacturing.

Autocollimators or laser interferometers look more attractive for checking flatness, but at the same time they have limitations, because the manufacturing of a reflecting mirror is extremely critical to the measurement, and the flatness of the mirror fluctuates from very small changes of air flow and air temperature, which in turn cause errors of measurement. The components that mount an interferometer are critical, subject to error causing movements and not convenient for a production environment. The cost of such a set up, both from equipment and cost of carrying out the process is often prohibitive for production applications.

All of these methods of measurement or evaluation of flatness are performed as the machine tool slide to be evaluated is incrementally shifted from one static position to another, or as the slide continuously moves at a very low speed to allow charting the data. In actual machining situations, especially in reciprocating grinding, the slide moves at a very high speed, with much greater dynamic forces being applied from the feeding mechanisms. This results in greater inertial forces, distortions and errors in the slide movement. The errors measured during the slide fabrication and evaluation at low speeds are quite different than the actual errors encountered during the actual machining process. The errors that occur, as shown in simplified form in FIGS. 1 and 2 and the methods of resolving such errors can be overcome with the present process as illustrated in FIGS. 3–11.

Figure 3:
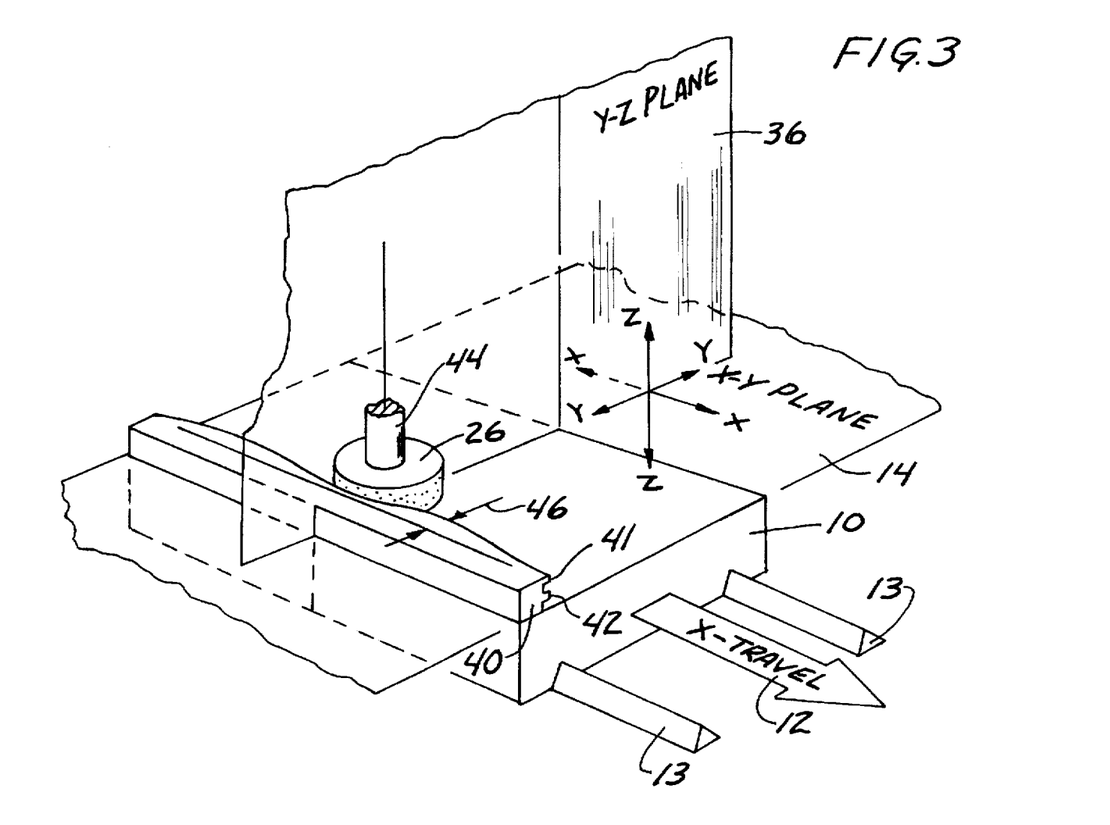
FIG. 3 represents the first step in forming a straight edge bar having a pair of rails thereon according to the present invention and showing a grinding wheel grinding the surface of the rails of the bar.
Figure 3A:
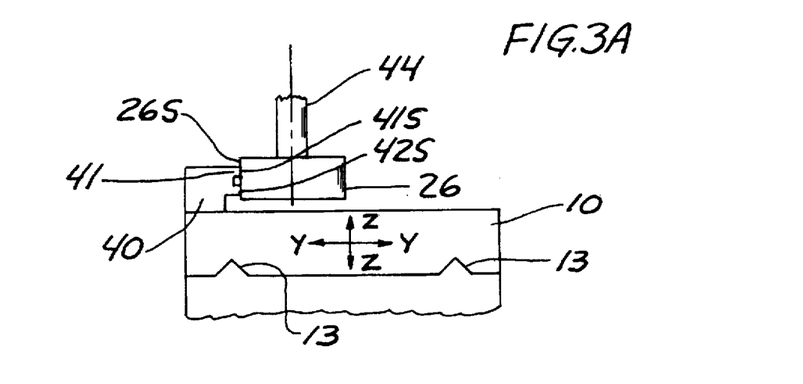

Referring first to FIG. 3, a length of a bar 40 (called a straight edge bar) has first and second parallel rails 41 and 42 on one side thereof and it is mounted onto a movable machine tool slide 10. The slide 10 is moved in direction along the X-axis 12 in a normal manner. A grinding wheel 26 mounted onto a spindle 44 of a machine tool that supports the slide 10 engages the edge surfaces 41S and 42S of the rails 41 and 42. The axis of the spindle 44 lies in the Y-Z plane 36, and is parallel to the Z-axis. During slide travel along the X-axis, as guided by ways 13, the outer edge surfaces 41S and 42S of rails 41 and 42 are ground by the grinding wheel 26 by the surface indicated at 26S.

During the travel of the slide 10, the surface of each of the rails is ground with a minimum amount of material removal for a good surface finish, taking care to make sure that the surface cleans up as it moves past the rotating grinding wheel. A minimum amount of material removed also lessens structural deformation of the components of the machine. The error or deviation of the slide from a straight line surface will be replicated on the ground surfaces 41S and 42S.

The feed rate of the slide 10 is the same as the feed rate expected to be used for actual machining in the most demanding precision machining operations to be performed. It is important to have similar dynamic conditions of the slide during both operations, that is, during the error evaluation and during actual machining.

After the initial grinding pass, the deviation of the surfaces 41S and 42S from a straight line replicates the horizontal error of the slide 10 in the X-Y plane 14. This error is shown between the double arrows 46. The error is exaggerated for purposes of illustration.

Figure 5A:
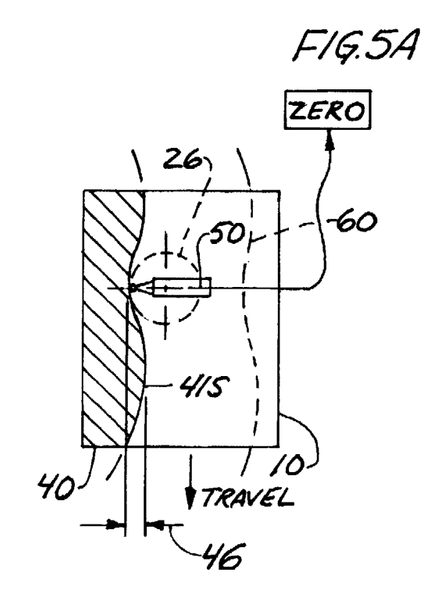
FIG. 5A is a schematic representation of the unsuccessful measurement of error of the machined bar shown in FIG. 4 because the error of the slide cannot be detected by sensor placed instead of cutting tool without rotation of the bar 180° about the longitudinal axis.

As shown in FIG. 5A, if a sensor 50 that is fixedly mounted in a suitable manner on the machine tool with a ball end "probe" precisely positioned to engage the surface 41S of the top rail 41 at the intersection of the Y-Z plane 36 and the surface 41S in place of the grinding wheel 26, and at the precise line of contact between the grinding wheel 26 and either the surface 41S or 42S, the sensor would show no error as the slide and bar 40 moved past the sensor. It is assumed that the slide 10 moves repeatedly with the same error stroke after stroke, when moved at the same feed rate. FIG. 5A schematically illustrates that the path 60 followed by the slide will be the same as the surface 41S created by a grinding wheel 26 so no error is sensed.

Figures 4, 4A:
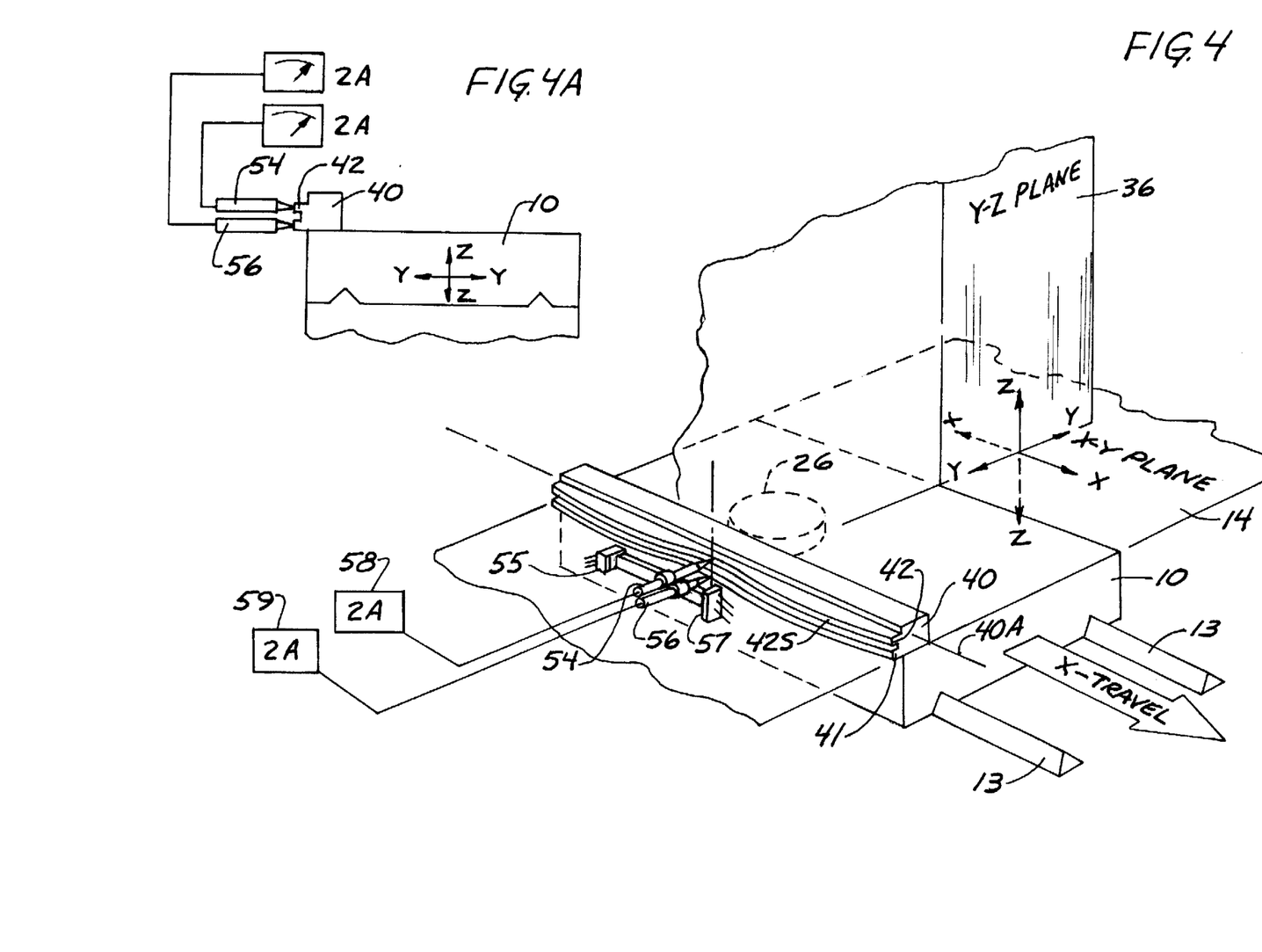
FIG. 4 is a schematic perspective view of the bar being formed to have a machined edge rotated 180° about the longitudinal axis to bring the machined surfaces to the exterior of the machine tool slide for tracing.
FIG. 4A is a schematic end view representation of the illustration of FIG. 4.

The next step of the process is illustrated in FIG. 4. The bar 40 is rotated 180° about its longitudinal axis shown in 40A, so that the rails 41 and 42 are on an opposite side of the bar 40 from the position of the grinding wheel 26 which is shown in dotted lines in FIG. 4. The rail 42 is now on the top while rail 41 is on the bottom. The rails 41 and 42 extend outwardly from what is illustrated as the edge of the machine tool slide 10. The axis 40A is parallel to the X-axis or direction of travel of the machine tool slide 10. The bar 40 will be clamped in place on the slide in a desired manner, taking care not to distort the shape of the bar 40 or the rails 41 or 42.

A pair of sensors indicated at 54 and 56, respectively, are mounted on suitable clamps 55 and 57 back to the machine tool frame. These mountings are shown only schematically and can take any desired form. The sensors have a lineally moving ball end or stylus and are positioned so that the bisecting planes of the ball ends lie on the Y-Z plane 36. The respective ball ends contact the surfaces 41S and 42S at exactly the same line as the grinding wheel 26 did when the surfaces were initially ground. Each sensor 54 and 56 individually senses the respective surfaces 41S and 42S, and are positioned at the same vertical plane as the axis of rotation of the grinding wheel 26. When the slide 10 is moved with the bar 40 in this position, the read out devices shown schematically at 58 and 59, respectively, on the sensors will indicate double the error of the slide 10. In other words, if the error of the slide actually is considered "A", the indications on the read out devices 58 and 59 will be 2A from a reference position as the slide moves.

Figure 5B:
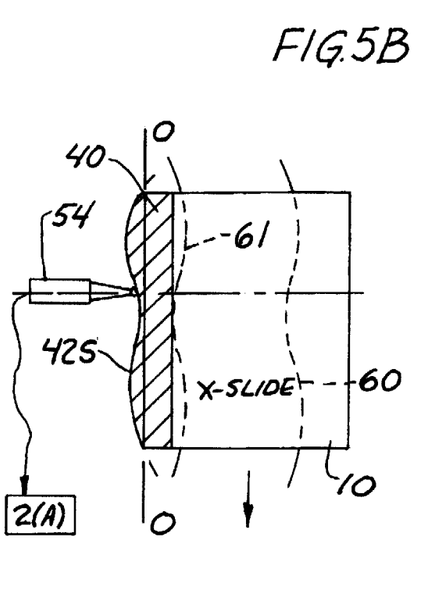
FIG. 5B is a schematic representation showing measurements of a surfaces of a bar positioned as shown in FIG. 4, and illustrating the double error that will be sensed.

Thus, the data from the sensors position shown in FIG. 4 can be used to determine the amount of error or slide 10. This is also illustrated schematically in FIG. 5B. In FIG. 5B, and also in FIG. 5A, the actual slide path is represented by the dotted line 60, and in FIG. 5B, the path followed by the grinding wheel on the control bar 40 is illustrated by the dotted line 61. These dotted lines 60 and 61 are also shown in FIG. 5C.

The sensor 54 is illustrated in FIG. 5B, and moves along the surface 42S when the slide 10 moves in the direction illustrated by the arrow, and will show a double error 2(A).

Figure 5C:
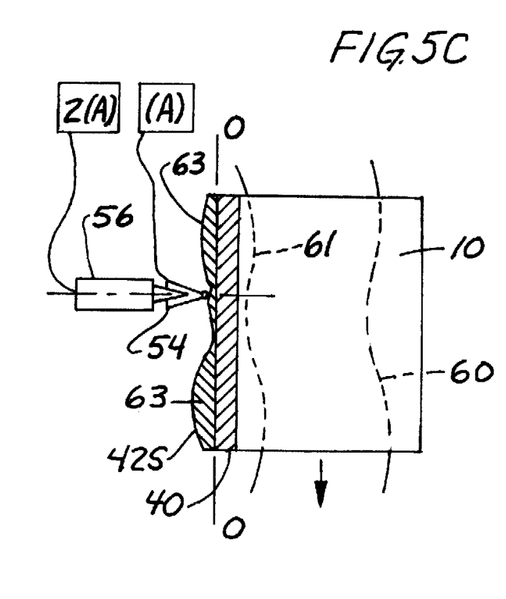
FIG. 5C schematically illustrates the amount of material equal to the error of the slide that must be removed from one of the rails formed on the bar to obtain a straight edge surface. This error can also be considered as an error to be compensated to create a straight machined surface on the workpiece. In this case the reference bar is used directly the way it is after machining without the straightening procedure.
Figures 6, 6A:
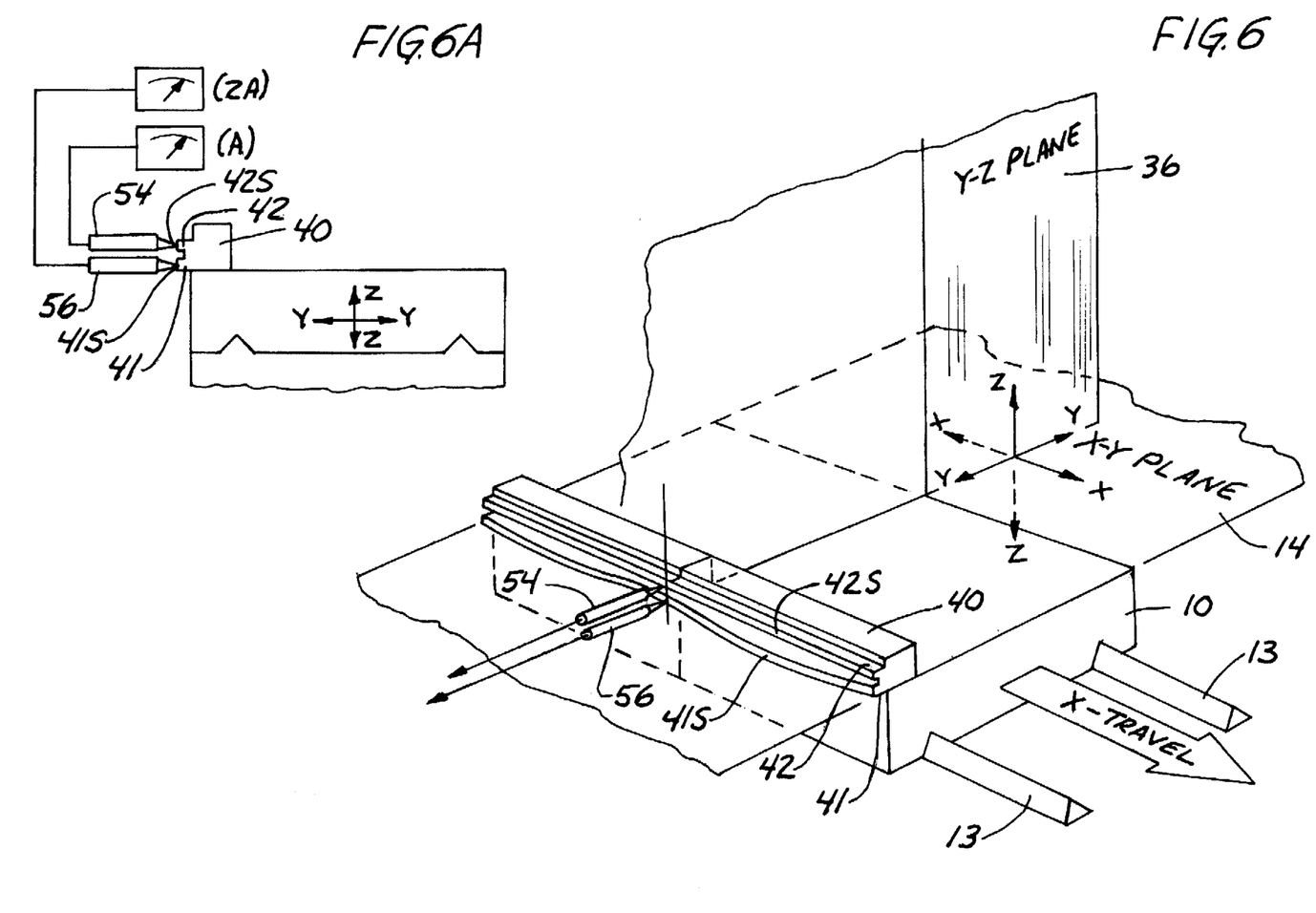
FIG. 6 is a schematic perspective representation of a machine tool slide showing the formed straight edge on the bar in position on the machine tool slide.
FIG. 6A is a schematic end view representation of FIG. 6.

The next step for obtaining a straight surface on one of the rails, for example on rail 42, utilizing features of the present invention are illustrated in FIG. 5C, FIG. 6 and FIG. 6A.

The next step of the process is to remove material from the rail 42 (or 41 if desired) in the sections that are indicated at 63, and this can be done by scraping, honing, or otherwise refining the surface 42S. The referring continues until the sensor 54 shows exactly one-half of the error indicated by the sensor 56 at all positions along the surface. When that occurs, the surface 42S will be a perfectly straight, flat plane, and the sensor 54 will show the actual error of the slide 10 in the X-Y plane.

Figures 7, 7A:
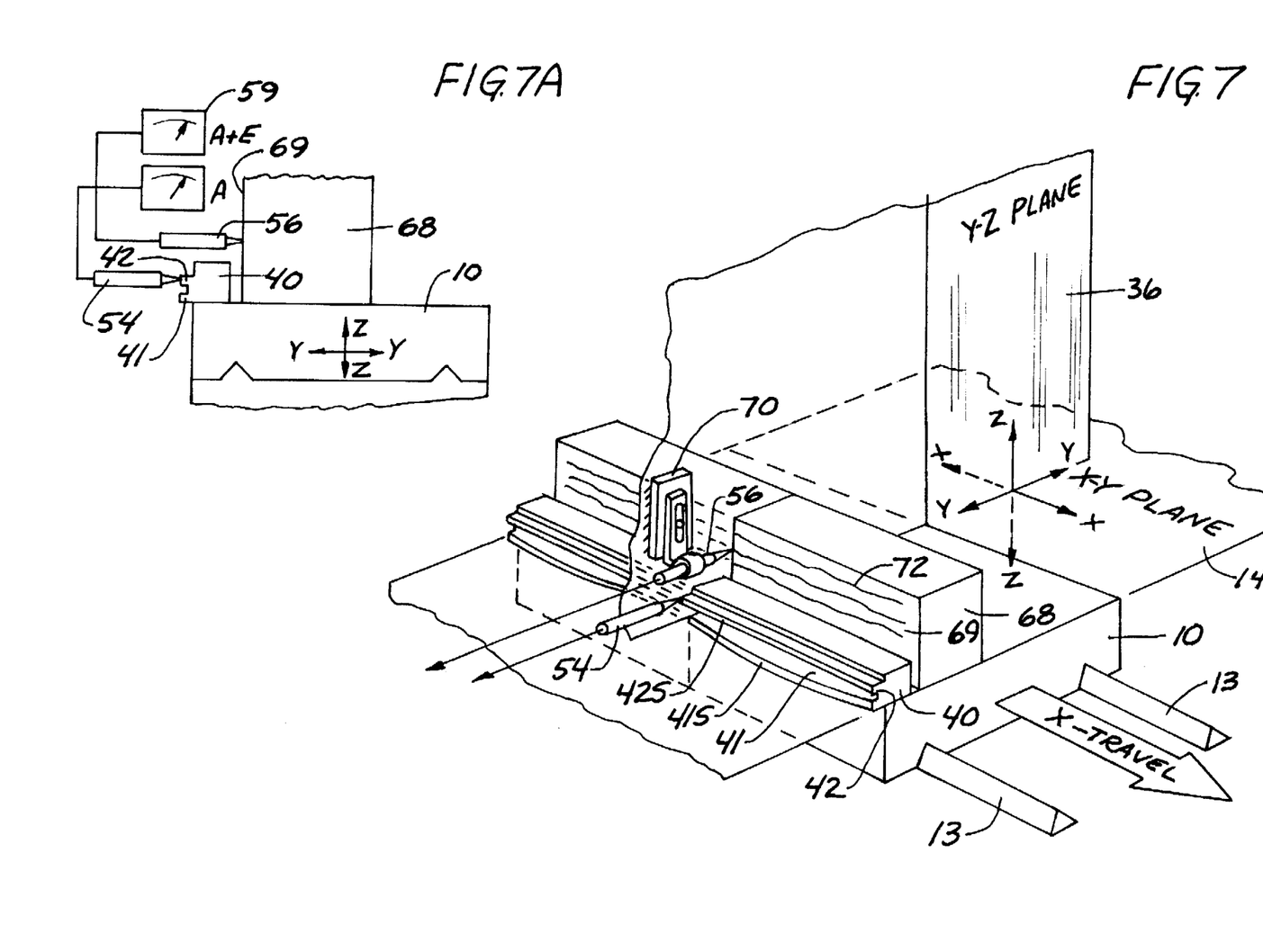
FIG. 7 is a schematic perspective representation showing an arrangement of sensors sensing a machined surface on the workpiece and comparing it to the conditions of the straight edge formed on the bar.
FIG. 7A is a schematic end view representation of FIG. 7.

Thus, the surface 42S has been formed into a straight edge that can be used for closed loop control for mounting of a workpiece for compensating movement in a direction along the Y-axis and to compensate for errors of the slide movement along the X-axis, or as can be seen in FIG. 7, the arrangement can be used for checking the machined or ground surface of a workpiece that has been machined, to measure actual deviation of the machined surface from the desired straight line. As shown in FIG. 7, a production workpiece 68 is mounted on a slide 10 in a suitable manner, and the sensor 56 can be moved to engage the machined side surface 69 of the workpiece 68. The sensor 56 is supported in a suitable support bracket relative to the machine tool frame, and with the center of the ball end lying along the Y-Z plane. Both the sensor 54 and the sensor 56 engage the respective surfaces 42S and 69 at the intersection of the Y-Z plane with such surfaces. The sensor 56 will indicate the error from straightness by comparing the reading of the sensor 56 with the reading obtained from sensor 54, which is riding along the straight edge surface 42S. The indicator 58 for sensor 54 will indicate the actual error of the machine slide 10, as explained and the indicator 59 for sensor 56 will indicate the error of the machine slide plus or minus any error of the surface 69 from a straight, flat plane.

If the sensor 56 is mounted onto an adjustable support relative to the machine tool, which is indicated schematically at 70, individual traces can be made along the surface 69 at various positions along the Z-axis. Such traces are indicated at 72, so that the straightness and flatness of the surface 69 at selected vertical positions can be fully inspected.

With a substantial length in vertical direction of the surface 69, this process or repeated traces can become quite time consuming and it is more convenient to create a planar, flat surface on a bar while mounted on the machine tool so the surface of the bar would be flat in vertical direction. If the guide bar is created to be flat in vertical direction, vertical errors could be corrected while machining the workpiece, or precise checking of the straightness of the workpiece can be done if the workpiece has been machined without error correction. Such checking can be done without disturbing the workpiece installation, then there is more likely to be precise measurements of the workpiece straightness.

Figures 8, 8A:
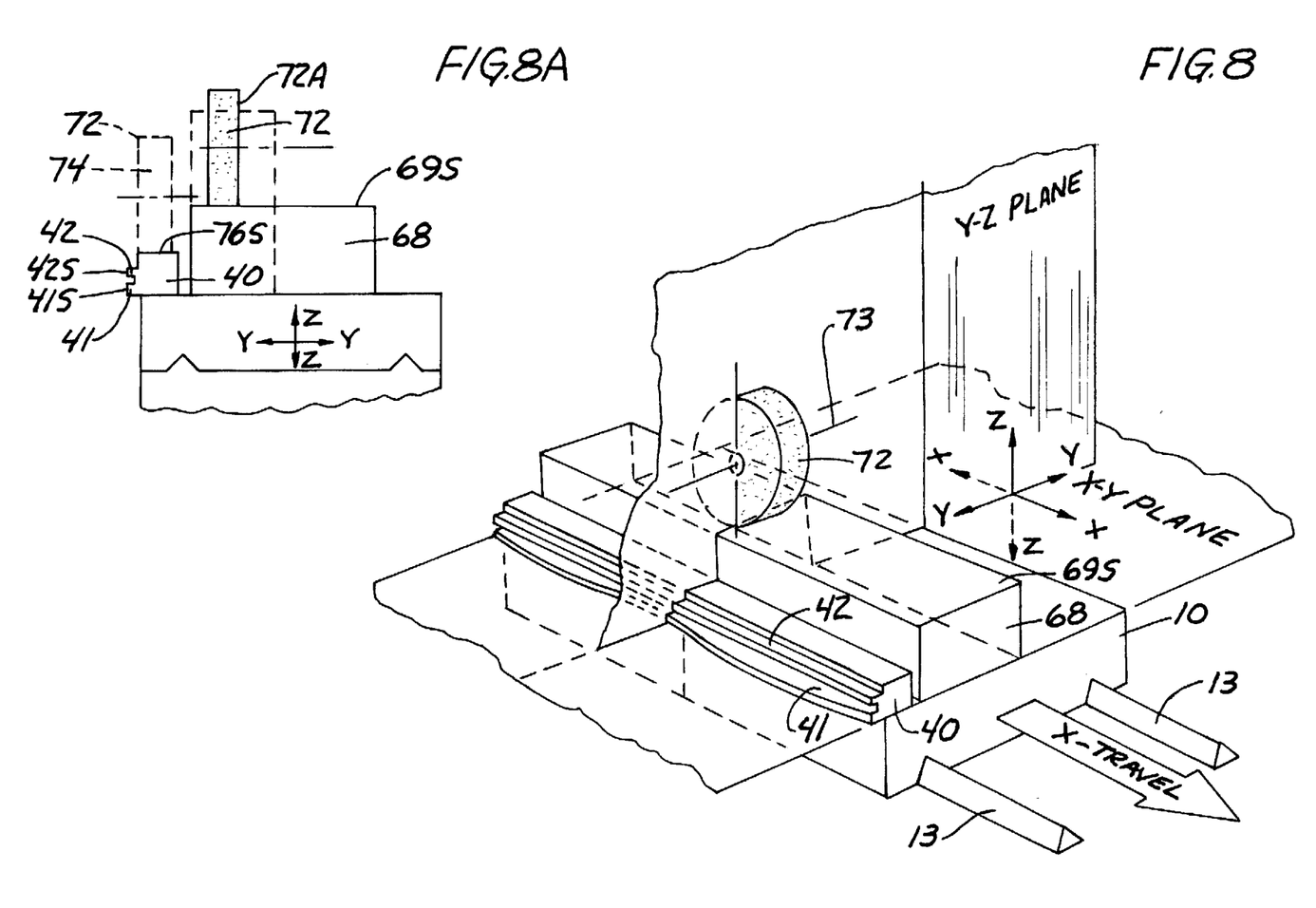
FIG. 8 is a schematic perspective representation illustrating the forming of a surface for measuring deviations in a vertical or Z-axis direction.
FIG. 8A is a schematic end view representation of FIG. 8.

As shown in FIG. 8, in order to accomplish the flat, straight surface in vertical direction, a grinding wheel 72 is mounted about a horizontal axis 73 in a first position, shown generally at 72A. The axis lies along the Y-Z plane and is parallel to the Y-axis. A second grinding position of grinding wheel 72 is shown in dotted lines in FIG. 8A at 74. The vertical height of these two consecutive grinding wheel positions 72A and 74 is adjusted so that a minimum amount of material is removed from the top surface 76S of the bar 40, as well as from the surface 69S of workpiece 68. The first position 72A of the grinding wheel 72 along the Y-axis while grinding the workpiece must be as close as possible to the second position 74 while grinding the rail, so that the vertical error of the slide does not differ in these two positions due to the short distance between the positions along the Y-axis.

When the machine tool slide 10 is moved along its X-direction path, the surface 69S on the top of the workpiece 68 and the top of the bar 40 will represent the slide vertical error (Z axis translation) during normal speed travel of the slide 10 in a machining operation. The arrangement is then made shown in FIG. 9. The workpiece 68 is placed on its edge so that the surface 69S is vertical, and the sensor 54 is mounted to sense the surface 42S as previously shown in relation to FIG. 7 and sensor 56 is mounted to sense surface 69S as the machine tool slide 10 moves past the sensors. Additionally, a third sensor 80 is mounted relative to the machine tool frame and is positioned to engage the surface 76S on bar 40.

Figures 9, 9A:
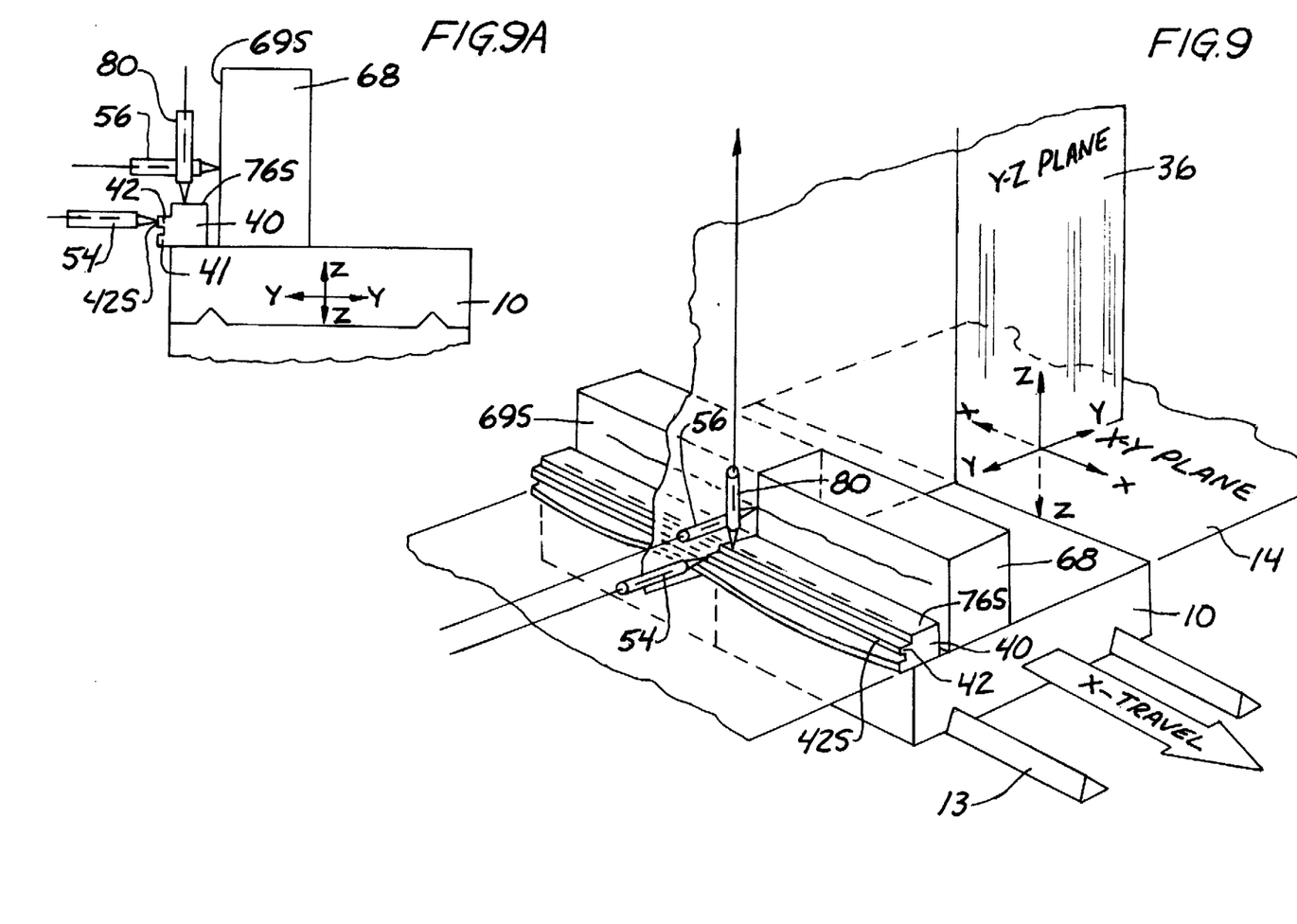
FIG. 9 is a perspective schematic view illustrating a further step in sensing the surfaces machined as shown in FIG. 8 for obtaining a straight flat top surface for controlling vertical deviations from a straight line.
FIG. 9A is a schematic end view representation of FIG. 9.

As was explained, the difference in the readings between sensors 54 and 56 will indicate the actual error of the machined surface 69S of the workpiece that occurred during the machining operation due to a vertical error of the slide 10 as it moves. Sensor 80 will essentially show a zero deviation as the surface 76S moves past the sensor 80, because sensor 80 will be following the same pattern of the slide 10 as the slide 10 made during the grinding of the surface 76S. If the top surface 76S of the bar 40 is perfectly straight then sensor 80, tracing along this surface 76S, would show the full vertical error of the slide. This error value already can be obtained as a difference between the readings of sensors 54 and 56. The top surface of bar 40 can be scraped, honed, or refined by other means until sensor 80 shows the same value at selected position along surface 76S as the difference between the readings of sensors 54 and 56 at the same slide position along the X-axis. When the refining operation for forming the surface 76S flat is complete, the reading of the sensor 80 is equal to the difference between the readings of sensors 54 and 56, and the top surface of the bar 40 is a straight, planar surface.

To complete the analysis of error, it is noted that the vast majority of the machine tool slides used in industry have two sliding guides such as those shown at 13, or a rectangular cross section guideway. The slide itself is not exactly a monoplane structure. Therefore, the straightness of each guide 13 and the parallelism of the guides 13 to each other will affect the total error of the slide in the vertical and horizontal planes, and especially will affect the "roll" error.

Figures 10, 10A:
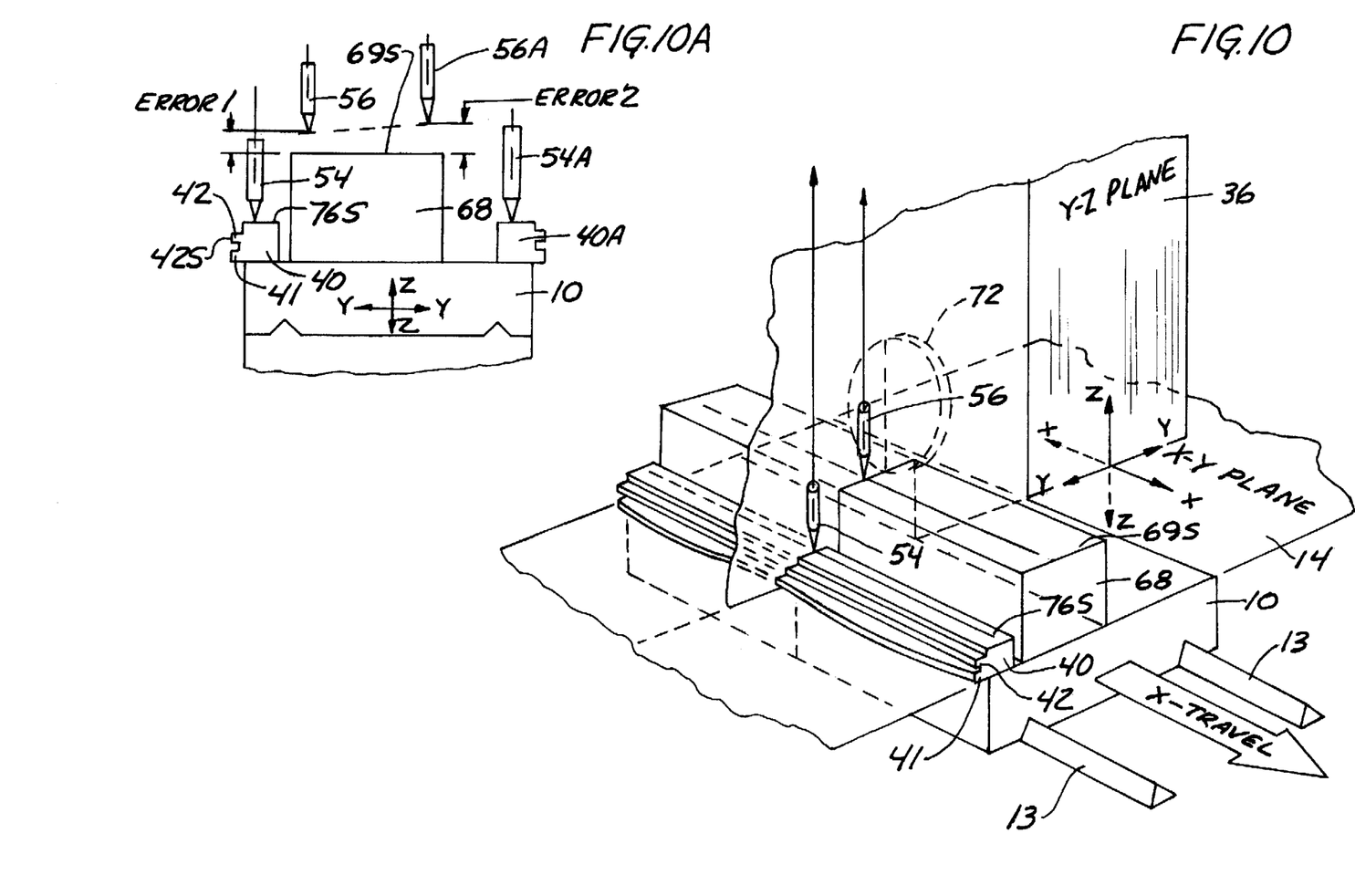
FIG. 10 is a further perspective schematic representation of sensing a machined surface to determine deviations along the Z-axis or in a vertical plane.
FIG. 10A is a schematic end view representation of FIG. 10.

To have a full picture of the slide error, a similar installation of the bar 40A with similar procedure for creation of the straight edges in the horizontal and vertical planes should be done on the opposite side edge of the slide as shown in FIG. 10A. A sensor 54A engages the top surface of the bar 40A. A sensor 56A then would sense the opposite edge of surface 69S. This will allow one to evaluate the errors on both sides of the slide 10, especially in a vertical X-Z plane and then one can interpolate the proportional error anywhere between the edges along a Y-axis.

The different vertical errors, labeled error 1 and error 2 on opposite sides of the workpiece are shown in FIG. 1 as well as in FIG. 10A. These errors can be sensed and used for interpolation of the slide error along the Y-axis. After completion of the straight flat reference surfaces on the bar, the surfaces of the bar installed on the slide have precision straight edges in two planes: in a horizontal X-Y plane and in a vertical X-Z plane. This allows inspection of the workpieces machined on the slide, right after machining and without disturbing the installation of the workpiece. It also allows use of such machine as a measuring inspection device to measure the straightness of the workpieces machined elsewhere, on any other equipment.

Figures 11, 11A:
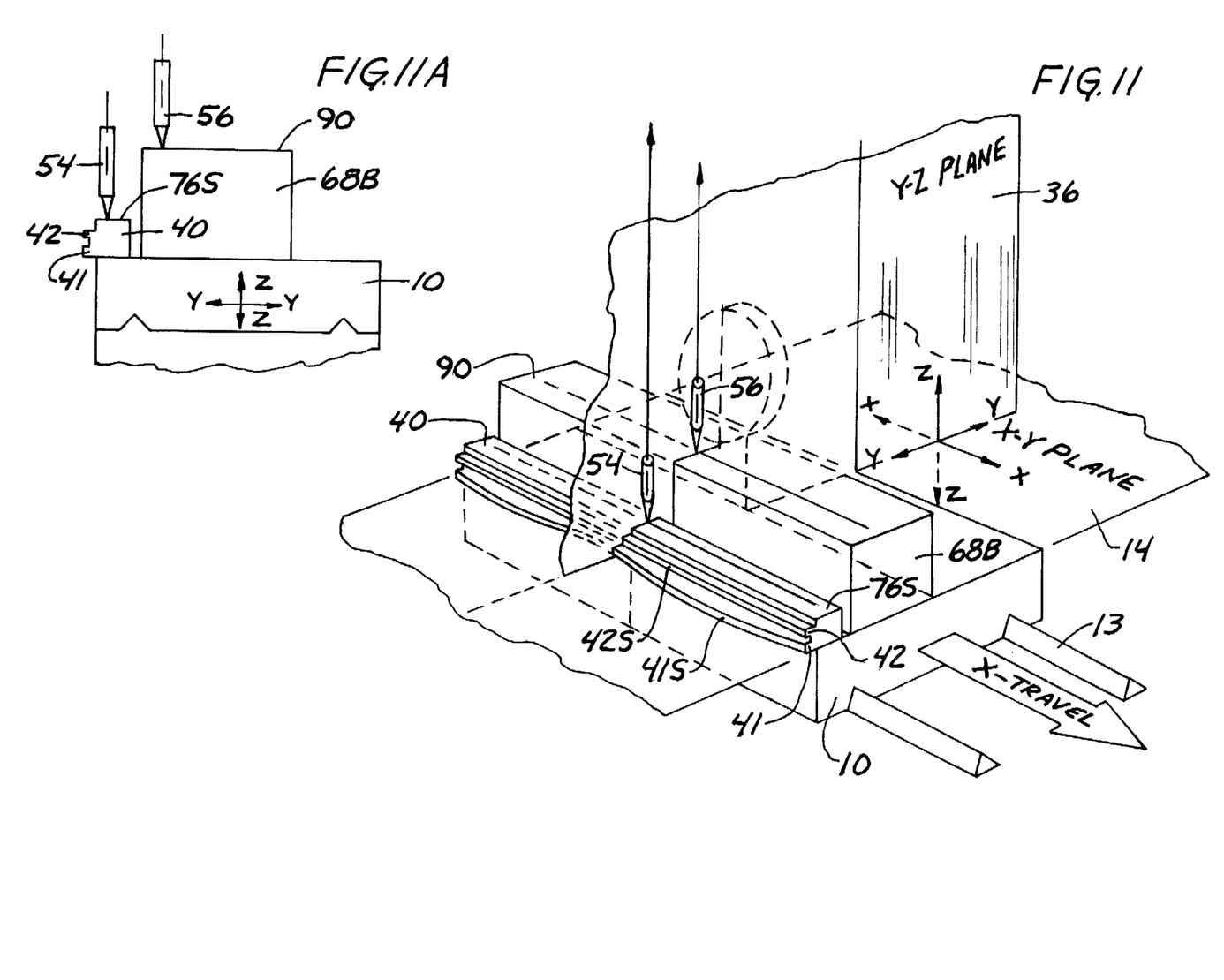
FIG. 11 is a view similar to FIG. 10 illustrating a just machined workpiece in the process of inspection.
FIG. 11A is a schematic end view of FIG. 11.

An installation such as that shown in FIGS. 11 and 11A can be set up, with a new workpiece 68B having a just machined surface 90 which is facing upwardly, and is parallel to the surface 76S of the bar 40. Sensor 56 can then be positioned so that the center line of the sensor sensing ball is right on the Y-Z plane as shown in FIG. 11, and is also on the same plane therefore as the sensor 54. The sensor 56 and the sensor 54 are supported relative to the machine tool frame on suitable supports.

Again assuming that the surface 76S has been scraped or honed or modified to be flat as outlined, this allows inspection of workpieces such as that shown at 68B which are inspected on the slide 10 right after machining, without disturbing the clamping or installation of the workpiece that was made for its machining. The inspection can be done in two planes. In the horizontal X-Y plane and in a vertical X-Z plane. FIG. 11 shows inspection in the vertical X-Z plane. The data is acquired by obtaining the data from the sensor tracing the appropriate straight edge, namely sensor 54 tracing on the surface 76S, and then utilizing the sensor 56 to sense the surface indicated at 90, which has just been ground on the workpiece 68B. Since both sensors 54 and 56 as shown in FIG. 11A are contacting the respective surface at the same line or point where the cutting tool contacted the workpiece surface, the sensor 56 when installed as shown in FIG. 11A will theoretically show a zero error, because it will be following the path cut by the grinding wheel 72 when the surface 90 was machined. The sensor 54, because it is riding on a straight, flat surface 76S, will indicate the actual vertical error of the slide 10 when the slide 10 is moved with the sensors in the positions shown in FIGS. 11 and 11A. Any deviations from a zero indication by the sensor 56 will be equal to the difference between the slide error detected by sensor 54 and the actual profile of the surface 90 machined on the workpiece 68B. Depending on the polarity, this value must be added or subtracted to the value of the error shown on sensor 54, and the resulting value will represent the actual deviation of the profile of the machined surface 90 from a straight line.

The present process has the advantages of the straight edge being created directly on the machine tool that will be used in the actual machining operation, and the length of the straight edge is limited only by the stroke used for the machine slide 10 that is to evaluated. The straight edge created on the machine is less affected by the weight, the method of support, the shape, the material, or the size of the bar that is used for forming the straight surfaces.

The bar 40 that has the rails and the straight surface thereon is used in a continuously clamped condition, without moving it to a different position on the machine. This eliminates handling problems and also eliminates distortion errors resulting from unknown deflections of the straight surfaces due to handling and different conditions of support.

The straightness of the edge surface being used can be verified and corrected if necessary without releasing the clamps holding the bar in place on the machine tool. The total strength of the bar having the straight edge and any distortion depend on the strength of the slide of the machine on which it is mounted, rather than the bar itself. This provides for a much more stable support to the bar having the straight edge, and the bar is less sensitive to deviations caused by its own weight or due to changes in the temperature of the environment.

The bar 40 having the straight edge can stay with the machine tool in production, so that monitoring the performance of the slide 10 of that particular machine tool and its deterioration due to wear, temperature changes and the like is easily carried out. A machine tool with such a bar having straight edges or surfaces can also be used for the measurement of part straightness after the parts are fabricated on this machine tool, or even if they are fabricated on a separate machine tool and then placed on the slide 10.

The conditions for the most precise formation of the straight edge on a control bar and the inspection of a workpiece on the slide is based on the fact that the contact between the cutting tool and the workpiece is either a point or a line located in the Y-Z plane, as illustrated in FIG. 3. The vertical errors of the X-axis slide are measured in the Y-Z plane, which is positioned perpendicular to the X-Y plane, and going through the point or line of contact between the workpiece and the cutting tool. The vertical errors of the X-axis slide are measured on each side of the slide in the Y-Z plane, and this is the "roll" error. This represents the sum of all measure errors affecting the flatness, resulting from all major inaccuracies in the Z-axis, and roll and pitch.

Machine tool slides and the slide feeding mechanism operate consistently, and generally the path traveled is repeatable, and consistent, and if wear occurs the error changes gradually rather than suddenly. The tracing surfaces are machined on each side of the slide at the actual feed rate of the longitudinal travel used in machining operations.

The actual machining of the surfaces used for sensing is done with a minimal material removal so that a good surface finish is obtained, and the best error presentation on the tracing surface is performed. This allows for minimal forces between the workpiece and the cutting tool and for the consistent and minimal structural deformation of the machine tool under these machining forces. This also reduces tool wear, and any additional error that results from tool wear. Further, one can replicate the actual error of the slide in the machined surface with a minimum of distortion.

The straight edge surface and the surface 76S can then be used to inspect respective surfaces being machined by comparing the readings of the straight, flat surfaces of the straight edge bar with readings taken on the machined surfaces of the workpiece. Adjustment can be done only by closed loop control for error compensation. Production part checking in place can then be carried out that way.

Although the present invention has been described with reference to preferred embodiments, workers skilled in the art will recognize that changes may be made in form and detail without departing from the spirit and scope of the invention.

What is claimed is:

1. A method of obtaining a slide error and creating a straight flat surface on a straight edge bar comprising the steps of:

mounting on a machine tool slide a bar having a pair of spaced apart substantially parallel edge surface portions facing a machine tool that engages both of the surface portions, said surface portions extending along a longitudinal axis of the bar which is substantially parallel to the direction of travel of the machine tool slide;

removing material from both of said edge surface portions with a machine tool while the machine tool slide is moved at a feed rate substantially equivalent to that used during actual machining operations;

rotating the bar about its longitudinal axis, and positioning said bar with the edge surface portions to be engaged by a pair of sensors, each sensor being on a separate one of the edge surface portions;

determining the error from a reference position of the edge surface portions; and removing material from a first of the edge surface portions, the amount of material removed determined by comparing the readings of the sensor on the first edge surface portion relative to the sensor on a second edge surface portion as the tool slide is moved along its direction of movement until the first edge surface portion is indicated as being straight.

2. The method of claim 1 including the step of removing material in selected places on the first edge surface portion sensed by the first sensor until the error is one-half of the error sensed by the second sensor on the second edge surface portion.

3. The method of claim 1 including the step of clamping the straight edge bar in position without distorting the straight edge bar.

4. The method of claim 1, wherein the straight edge bar has a pair of rails formed thereon, the edge surface portions being on the outer edge of the rails respectively.

5. The method of claim 1 including the further step of simultaneously machining a separate surface on a workpiece on the table and a third surface of said straight edge bar which are perpendicular to the edge surface portions and are parallel to each other, rotating the workpiece to position the separate surface of the workpiece to be substantially parallel to the first edge surface portion, and separately sensing the difference in deviation from a reference between the first edge surface portion and the separate surface of the workpiece, and simultaneously sensing deviation from a reference of the third surface of the straight edge bar as the machine tool slide is moved along its path, removing material from portions of the third surface of the straight edge bar until the sensed deviation of the third surface at selected points is substantially equal to the difference in deviation from the respective reference between the first surface portion and the separate surface of the workpiece.

6. The method of claim 5, wherein the movement of the slide is at working speeds during the machining and sensing steps.

7. The method of claim 1, wherein a minimum material is removed during the removing step but both edge surface portions are machined along their entire length.

8. The method of claim 1 including the step of placing both sensors to engage the respective surfaces on the plane perpendicular to the direction of movement and including a line along which the machine tool engages the edge surface portions during the determining and removing steps.

9. The method of claim 8 including the further step of inspecting a machined surface of a workpiece on the machine tool slide by comparing deviations between a surface of the workpiece to be inspected and the first edge surface portion.

10. A method of obtaining a slide error and creating a straight flat surface on a straight edge bar comprising the steps of:

mounting on a machine tool slide a bar having at least a first surface portion facing a machine tool that engages the first surface portion;

a second surface portion on a bar mounted on the slide and fixed relative to the first surface portion, and facing a machine tool that engages the second surface portion, the surface portions each extending along a longitudinal axis substantially parallel to the direction of travel of a machine tool slide and both facing in a first direction;

removing material from both of the first and second surface portions with a machine tool while the machine tool slide is moved at a feed rate along its direction of travel substantially equivalent to that used during actual machining operations;

rotating the first and second surface portions 180° to face the first and second surface portions in an opposite direction from the first direction; and removing material from the first surface portion and comparing measured deviations of the first surface portion relative to the second surface portion from a reference position as the machine tool slide is moved in its direction of movement until the first surface portion deviation at selected locations is substantially one half the deviation of the second surface portion.

11. The method of claim 10 including sensing the deviation of both the first and second surface portions with separate sensors engaging the respective surface portions at a point lying on the line of contact of the machine tool and the respective surface when the surfaces were being machined.

12. The method of claim 11, wherein the removing step comprises removing material in selected places on the first surface portion engaged by a first sensor until the error is one-half of the error sensed by a second sensor engaging the second surface portion.

13. The method of claim 10, wherein both the first and second portions are on a single straight edge bar.

14. The method of claim 13, wherein the straight edge bar has a pair of rails formed thereon, the first and second surface portions being on the outer edges of the rails, respectively.

15. The method of claim 10 including the further step of simultaneously machining a separate surface on a workpiece on the table and a third surface of the straight edge bar which are perpendicular to the first and second surface portions and are parallel to each other, rotating the workpiece to position the separate surface of the workpiece to be substantially parallel to the first surface portion, and separately sensing the difference in deviation from a reference between the first surface portion and the separate surface of the workpiece, and simultaneously sensing deviation from a reference of the third surface as the machine tool slide is moved along its path, and removing material from portions of the third surface until the sensed deviation of the third surface at selected points is substantially equal to the difference in deviation from the respective reference between the first surface portion and the separate surface of the workpiece.

\* \* \* \* \*